(12) United States Patent
Kane et al.

(10) Patent No.: US 8,175,530 B2
(45) Date of Patent: May 8, 2012

(54) PERSONALIZING ENTERTAINMENT EXPERIENCES BASED ON USER PROFILES

(75) Inventors: John Richard Kane, Fox River Grove, IL (US); Andrew J. Aftelak, Palantine, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 1000 days.

(21) Appl. No.: 12/137,839

(22) Filed: Jun. 12, 2008

(65) Prior Publication Data

US 2009/0312096 A1 Dec. 17, 2009

(51) Int. Cl.
H04B 7/00 (2006.01)
(52) U.S. Cl. .................. 455/41.3; 455/41.2; 455/66.1
(58) Field of Classification Search .................. 455/41.3, 455/41.2, 66.1
See application file for complete search history.

(56) References Cited

U.S. PATENT DOCUMENTS

| | | |
|---|---|---|
| 2001/0016518 A1 | 8/2001 | Nishiumi et al. |
| 2001/0054054 A1 | 12/2001 | Olson |
| 2004/0005927 A1 | 1/2004 | Bonilla et al. |
| 2004/0203368 A1 * | 10/2004 | Haller et al. .................. 455/41.2 |
| 2007/0270222 A1 | 11/2007 | Yamanaka et al. |
| 2009/0146779 A1 * | 6/2009 | Kumar et al. .................. 340/5.31 |

FOREIGN PATENT DOCUMENTS

| | | |
|---|---|---|
| JP | 2007-300973 A | 11/2007 |
| KR | 10-2000-0054349 A | 9/2000 |

OTHER PUBLICATIONS

Won Ho Kye, "PCT/US2009/046532—PCT International Search Report and Written Opinion," WIPO, ISA/KR, Korean Intellectual Property Office, Daejeon, Republic of Korea, Jan. 20, 2010, 11 pages, most relevant pp. 7-8 and 10-11.

* cited by examiner

Primary Examiner — Lewis West

(57) ABSTRACT

A method and wireless device (102) dynamically adapt a physical entertainment experience for a user of an entertainment system. At least one communication device (106) associated with an entertainment device (120) is situated in close proximity to the entertainment device (120). At least one user profile (114) is wirelessly transmitted from the wireless device (102) via the at least one communication device (106) to a controller (104) associated with the entertainment device (120). The user profile (114) includes at least a set of preferences associated with at least one sensory effect available at the entertainment device (120). The controller (104) uses the set of preferences to dynamically adapt a behavior of the entertainment device (120) with respect to the at least one sensory effect for at least one user associated with the wireless device (102).

17 Claims, 6 Drawing Sheets

114

| SENSORY EFFECTS | INTENSITY LEVEL | ... |
|---|---|---|
| HAPTIC_VIBRATION | 5 | ... |
| HAPTIC_AIR | 9 | ... |
| AUDITORY | 3 | ... |
| VISUAL_COLORED_FLASHING_LIGHTS | 2 | ... |
| VISUAL_BW_FLASHING_LIGHTS | 0 | ... |
| VISUAL-VIDEO | 3 | ... |
| MOVEMENT_ROTATIONAL | 8 | ... |
| MOVEMENT_TILT | 10 | ... |
| ... | ... | ... |

*FIG. 2*

PERSONALIZING ENTERTAINMENT EXPERIENCES BASED ON USER PROFILES

FIELD OF THE INVENTION

The present invention generally relates to the field of entertainment systems, and more particularly relates to personalizing entertainment experiences of users of entertainment systems based on user profiles.

BACKGROUND OF THE INVENTION

Many entertainment venues such as theme parks and amusement parks offer a wide variety of rides, exhibits, and games that utilize sensory effects. Sensory effects such as flashing lights, blasts of air, and vibrations are used to provide a more realistic experience to individuals. However, some individuals may desire a greater intensity of sensory effects while other individuals may require lesser sensory effects or no sensory effects at all. Unfortunately, entertainment venues generally do not provide a dynamic and autonomic way for entertainment devices and systems to be personalized for each individual. Therefore a need exists to overcome the problems with the prior art as discussed above.

SUMMARY OF THE INVENTION

Briefly, in accordance with the present invention, disclosed are a method and a wireless device for dynamically adapting a physical entertainment system experience for a user. The method includes identifying at least one communication device associated with an entertainment device. The at least one communication device is situated in close proximity to the entertainment device. At least one user profile via the at least one communication device is wirelessly transmitted to a controller associated with the entertainment device in response to the at least one communication device having been identified. The user profile includes at least a set of preferences associated with at least one sensory effect available at the entertainment device. The controller uses the set of preferences to dynamically adapt a behavior of the entertainment device with respect to the at least one sensory effect for at least one user associated with the wireless device.

In another embodiment, a method, with an information processing system, for dynamically adapting a physical entertainment experience for a user of an entertainment system is disclosed. The method includes receiving, from at least one communication device situated in close proximity to an entertainment device, at least one user profile associated with a wireless device. At least one set of desired sensory effects, associated with at least one user associated with the wireless device, is identified in the at least one user profile. At least one behavior of the entertainment device is dynamically adapted based on at least one of the set of desired sensory effects.

In yet another embodiment, a wireless device is used to dynamically adapt a physical entertainment experience for a user of an entertainment system. The wireless device includes a memory and a processor that is communicatively coupled to the memory. The wireless device also includes an interaction manager that is communicatively coupled to the memory and the processor. The interaction manager is adapted to identify at least one communication device associated with an entertainment device. The at least one communication device is situated in close proximity to the entertainment device. At least one user profile is wirelessly transmitted, via the at least one communication device, to a controller associated with the entertainment device in response to the at least one communication device having been identified. The user profile includes at least a set of preferences associated with at least one sensory effect available at the entertainment device. The controller uses the set of preferences to dynamically adapt a behavior of the entertainment device with respect to the at least one sensory effect for at least one user associated with the wireless device.

One advantage of various embodiments of the present invention, such as discussed above, is that an entertainment experience such as (but not limited to) an amusement/theme park ride, exhibit, or game, is dynamically and automatically adapted according to each individual's preferences. An individual is able to create user profiles at a wireless device that specify desirable and/or undesirable sensory effects. These user profiles are utilized by each entertainment device at an entertainment venue to dynamically and automatically adapt an entertainment experience for the individual as one user, or for one or more users, of an entertainment system.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

FIG. 2 illustrates one example of a user profile according to one embodiment of the present invention;

DETAILED DESCRIPTION

As required, detailed embodiments of the present invention are disclosed herein; however, it is to be understood that the disclosed embodiments are merely examples of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically.

The term "wireless device" is intended to broadly cover many different types of devices that can wirelessly receive signals, and optionally can wirelessly transmit signals, and may also operate in a wireless communication system. For example, and not for any limitation, a wireless communication device can include any one or a combination of the following: a two-way radio, a cellular telephone, a mobile phone, a smartphone, a two-way pager, a wireless messaging device, a laptop/computer, a gaming device, a personal digital assistant, and other similar devices.

Operating Environment

Figure 1:
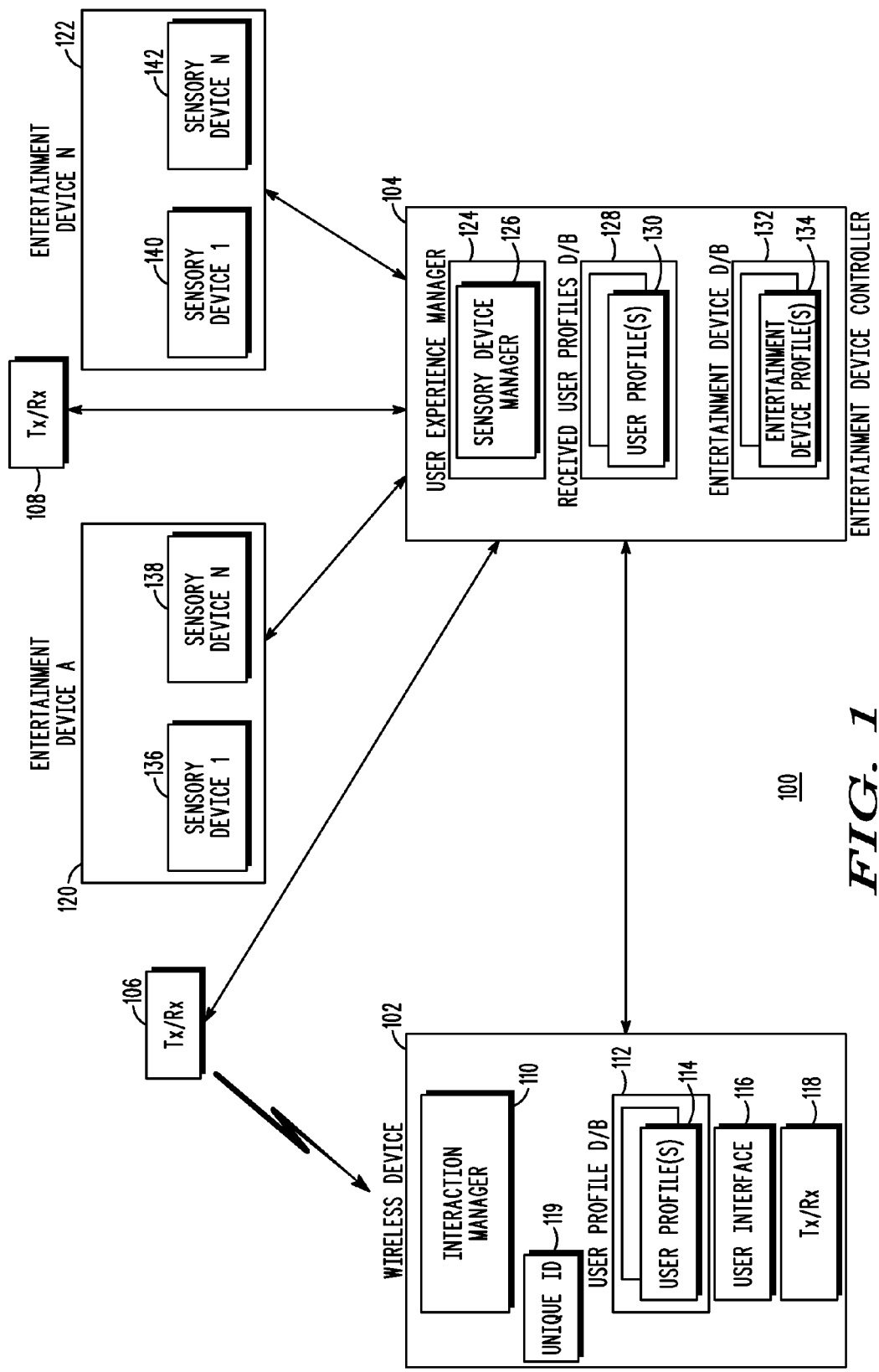
FIG. 1 is block diagram illustrating a general operational environment, according to one embodiment of the present invention.

According to one embodiment of the present invention as shown in FIG. 1 an operating environment 100 for implementing one or more embodiments of the present invention is illustrated. In particular, FIG. 1 shows one or more wireless devices 102 communicatively coupled to one or more entertainment device controllers 104 and/or communication devices such as transceivers 106, 108. Each wireless device 102 includes an entertainment device interaction manager 110 ("interaction manager 110"), a database/memory 112 including one or more user profiles 114, a user interface 116, a transceiver 118, and unique identifier information 119.

The interaction manager 110 manages the creation of user profiles 114, and establishes and manages communications between the wireless device 102 and the controller 104. For example, such communications can be established using wireless communications via the transceivers 106, 108. Also, other channels of communication can be used by the wireless device 102 to communication with the controller 104. For example, a wired network or other wired link can be used by the wireless device 102 to communicate with the controller 104. The database 112 maintains user profiles 114 that include user preferences for sensory effects experienced during use of an entertainment device 120, 122 of an entertainment system. An entertainment device 120, 122, in one embodiment, provides a user with amusements in the form of seating and/or standing while a user is interacting with a particular venue such as (but not limited to) amusement park rides, water park rides, museum exhibits, movie and theatrical exhibits, kiosk based exhibits, game consoles, and participative events at sporting venues.

The user interface 116 allows a user to create, delete, and modify user profiles 114. The user interface 116 also displays prompts or message received from the entertainment device controller 104. The transceiver 118 is used by the wireless device 102 to communicate with the communication devices 106, 108 associated with each of the entertainment devices 120, 122. The unique identifier information 119 uniquely identifies the wireless device 102. Each of the components of the wireless device 102 is discussed in greater detail below.

The entertainment device controller 104 is communicatively coupled to one or more of the transceivers 106, 108 and one or more entertainment devices 120, 122. The entertainment device controller 104, in one embodiment, is an information processing system that includes a user experience manager 124, a sensory device manager 126, a database/memory 128 including received user profiles 130, and a database/memory 132 including entertainment device profiles 134.

The user experience manager 124 manages information received from a wireless device 102, the retrieval of information from a wireless device 102, and the dynamic/autonomous adaptation of sensory devices 136, 138, 140, 142 at the entertainment devices 120, 122 to provide a personalized entertainment experience to an individual or one or more users of an entertainment system. The sensory device manager 126 performs the dynamic/autonomous adaptation of sensory devices 136, 138, 140, 142. For example, the user experience manager 124 can dynamically modify sensory effects such as (but not limited to) video, audio, movement (in the x, y, and/or z dimensions), and simulation of natural effects such as wind, rain, cold, and heat for each venue visited by an individual.

The first database 128 maintains user profiles 130 received from a wireless device 102. The second database 132 maintains entertainment device profiles 134 for one or more entertainment devices 120, 122 associated with the controller 134. An entertainment device profile 134 includes information such as to identify each sensory device 136, 138, 140, 142 of an entertainment device 120, 122, the sensory effects provided by each sensory device, and optionally a default intensity level of each sensory effect. It should be noted that the received user profiles 130 and the entertainment device profiles 134 can reside within the same database/memory. Each of the components of the entertainment device controller 104 is discussed in greater detail below. It should also be noted that although a single controller 104 is shown in FIG. 1, each entertainment device 110, 112 can be associated with a separate controller that includes some or all of the components discussed above.

An entertainment device 120, 122, in one embodiment, is part of an entertainment system for an amusement park ride/exhibit, a game, or the like. Each entertainment device 120, 122 includes one or more sensory devices 136, 138, 140, 142. A sensory device 136 for example, is a device that produces sensory effects such as visual, auditory, haptic, and movement effects or any other effect type that is perceivable by one or more senses of a user.

The transceivers 106, 108, in one embodiment, are geographically situated in close proximity to a corresponding entertainment device 120, 122. The wireless device 102 communicates with a transceiver 106 so that an entertainment experience provided by the entertainment device 110 is personalized (e.g., dynamically adapted) for an individual according to a user profile 130 received from the wireless device 102. Also, an individual can be notified of the sensory effects produced by the sensory devices 136, 138 utilized at an entertainment device 120 so that a user can determine if he/she wants to use/interact with the entertainment device 120.

Dynamically and Autonomously Adapting Entertainment Experiences

The following is a more detailed discussion on dynamically adapting (e.g. personalizing) an entertainment experience for a user based on one or more user profile(s). As discussed above, an entertainment device 120 such as an amusement park ride can utilize various sensory devices 136, 138 that produce sensory effects such as (but not limited to) lights, audio, video, air, and vibrations to provide a more realistic experience to a user. However, a user may only want to experience some of the available sensory effects or none at all. Furthermore, a user may want to be notified of the sensory effects provided during an entertainment experience such as a ride or game.

Therefore, in one embodiment, a user creates one or more user profiles 114 that are used by the entertainment device controller 104 for customizing an entertainment experience. A user profile 114, in one embodiment, is created by a user through the user interface 116 of the wireless device 102 and is associated with the user and/or one or other users such as a family member. The user interface 116 is configured to allow the user to create the user profile 114 via user input devices at the wireless device 102 such as a keyboard, screen, and/or a microphone. Additionally, the user interface 116 can be configured to allow the user to create a user profile 114 at another wireless device or at an information processing system such as a notebook computer or desktop computer. The user profile 114 is then transferred to the wireless device 102 either directly or through a network such as the Internet.

FIG. 2 shows one example of a user profile 114. In particular, FIG. 2 shows a user profile 114 including a sensory effects column 202 and an intensity level column 208. The sensory effects column 202 includes entries 204, 206 for one or more sensory effects. As discussed above, sensory effects can be haptic, movement related, splashes of water, spraying of liquids, auditory, visual, odiferous, or the like. For example, a first entry 204 under the sensory effects column 202 indicates "Haptic_Vibration" while a second entry 206 indicates "Visual_BW_Flashing_Lights".

In one embodiment, a user associates one or more sensory effects under the sensory effect column 202 with a given intensity level. For example, a sensory effect can be applied by the entertainment device controller 104 at various intensity levels such as levels 0-10, where level 1 is the lowest level, level 10 is highest level, and level 0 corresponds to "off" or "disabled". The user can select a specific level (or levels) for each sensory effect. For example, FIG. 2 shows that under the "Intensity Level" column 208 the user in a first entry 210 has selected a level of "5" for the "Haptic_Vibration" sensory effect and in a second entry 212 has selected a level of "0" for the Visual_BW_Flashing_Lights".

It should be noted that a user is not required to enter an intensity level for a sensory effect. For example, if a user does not enter an intensity level, the controller 104 applies a default intensity level for the sensory effect. Also, the various embodiments are not limited to levels indicated by numbers. For example, a user can also enter "low", "medium", "high", or use any other method for designating an intensity level. It should also be noted that the user profile 114 is not limited to the columns and/or entries shown in FIG. 2. For example, one or more columns and/or entries can be deleted and/or added to the user profile 114. It should also be noted that a received user profile 130 at the controller 104 is substantially similar to the user profile 114 shown in FIG. 2.

In another embodiment, the user can download profile templates associated with the entertainment devices 120, 122. For example, if the user is going to visit a theme park, the user can visit the park's website (or a third party's website) and download a profile template that is specific to an entertainment device 120 or a general profile that can be applied to one or more entertainment devices 120, 122. Therefore, a user can avoid having to manually enter each sensory effect that the user wants to include in the profile 114.

These profile templates can include all of the sensory effects available for the respective entertainment device 110 and optionally the intensity levels available for each sensory effect. The user can then adjust the intensity levels similar to that discussed above.

In another embodiment, a user can flag each of the sensory effects that the user desires to experience while interacting with the entertainment device 110. For example, the user can click on a box next to a sensory effect, click on the sensory effect information itself, or the like. This selection flags the sensory effect and indicates to the entertainment device controller 104 that the user desires to experience this particular sensory effect. Sensory effects that have not been selected (e.g., flagged) indicate that the user does not want to experience these sensory effects. The user saves the customized profile template as a user profile 114.

The user profiles 114, in one embodiment, are communicated to the entertainment device controller 104 associated with one or more entertainment devices 120 via a communication device such as the transceiver 106 or through a wired communication channel. In one embodiment, the transceiver 118 within the wireless device 102 establishes a local communication channel with the transceiver 106 communicatively coupled to the entertainment device controller 104. For example, the interaction manager 110 at the wireless device 102 establishes a connection with the transceiver 106 via the wireless device's transceiver 118 using a short range radio technology such as Bluetooth, Zigbee, or the like. It should be noted that the wireless device 102 can also utilize long range radio technology as well.

Once the connection has been established, the interaction manager 110 at the wireless device 102 sends one or more user profiles 114 to the entertainment device controller 104 through the transceiver 106. In addition to the user profile 114, a unique identifier 119 associated with the wireless device 102 is also sent along with the user profile 114 so that the controller 104 can associate the received profile 130 with the wireless device 102. In another embodiment, the user profile 114/130 includes the unique identifier 119. The controller 104 then stores the received user profile 130 in the received user profile database 128.

It should be noted that the user profiles 114 are not required to be stored on the wireless device 102. For example, a remote information processing system (not shown) can maintain the user profiles 114 and the wireless device 102 maintains a pointer such as (but not limited to) a URL link to the user profiles 114. The user experience manager 124 at the entertainment controller 104 receives or retrieves the pointer from the wireless device 102 and obtains the user profile 114 from the remote information processing system (not shown).

As a user associated with wireless device 102 is about to or has started to interact with an entertainment device 120, 122, the wireless device 102 transmits the unique identifier 119 to the controller 104 via a transceiver 106 associated with the entertainment device 104. In another embodiment, a user can manually enter the unique identifier 119 into the wireless device 102 via the keyboard of the wireless device 102. Once the wireless device 102 receives the unique identifier from the user, the wireless device 102 transmits the unique identifier 119 to the controller 104. Therefore, a user is able to manually signal the controller 104 that he/she is near an entertainment device 120 so that the controller 104 can activate a user profile 130 associated with that user. For example, the user can use a long range radio link to establish the user profile 130 with a controller 104 of an entertainment device 120 prior to interacting with that device 120. At a later point in time when the user is at the entertainment device 102, the user can activate the profile 130 by keying in the unique identifier 119 at the wireless device 102. It should be noted that a system operator proximate to the entertainment device 120 can also manually enter a unique identifier 119 associated with a wireless device 120 into the entertainment device 120/controller 104.

The user experience manager 124 at the controller 104 uses the unique identifier 119 to identify the user profile(s) 130 associated the wireless device 102. The sensory device manager 126 then uses the sensory effect information and intensity level information within the user profile 130 to dynamically adapt one or more behaviors, such as the utilization of sensory effects, of the entertainment device 120 to provide a personalized experience to the user, as discussed above.

For example, an entertainment device 120 such as a theme park ride, exhibit, or game, can utilize one or more sensory effects throughout the duration of the entertainment event. When the user boards the ride, enters the exhibit, or begins interacting with the game, the controller 104 associated with that device 120 analyzes the user profile 130 associated with the wireless device 102 for sensory effect information and optionally for intensity level information.

For example, a received user profile 130 including information shown in FIG. 2 is analyzed by the entertainment device controller 104 to identify that the user has designated various levels of intensity for a variety of sensory effects. The controller 104 also identifies that the user has not designated a level of intensity for the auditory sensory effect. Therefore, the controller 104 dynamically adapts the intensity level for each of the sensory effects available at the entertainment device 120 that substantially matches a designated sensory effect in the user profile 130 according the corresponding intensity level indicated in the user profile 120. For example, the entertainment device controller 104 adjusts the Haptic_Vibration sensory effect to level 5 (if not already set at level 5) and disables the Visual_BW_Flashing_Lights sensory effect. The controller 104, in this example, disables the Visual_BW_Flashing_Lights sensory effect because the user has designated a level 0 for this effect, which in this example indicates that the sensory effect is to be disabled.

If the received user profile 130 does not indicate an intensity level, the entertainment device controller 104 can perform a default action such as use the default setting of the sensory effect, disable the sensory effect, and/or prompt the user via the user interface 116 for a user designated action. Also, if the user profile 130 does not include a sensory effect entry for a sensory effect available at the entertainment device, the controller 104 can similarly perform a default action such as use the default setting of the sensory effect, disable the sensory effect, and/or prompt the user via the user interface for a user designated action.

In another embodiment, the entertainment device controller 104 via the transceiver 106 associated with the entertainment device 120 can notify the user via the user interface 116 of the sensory effects available at the entertainment device 120. In this embodiment, the controller 104 compares a received user profile 130 to the entertainment device profile 134, which includes sensory device information associated with the available sensory devices 136, 138 at the entertainment device 120. The sensory device information can indicate the type of sensory effects produced by each sensory device 136, 138, the default intensity levels associated with each sensory effect, and the like. If the entertainment device controller 104 determines, based on this comparison, that a sensory device 136, 138 of the entertainment device 120 produces one or more sensory effects the user has designated as being undesired, the controller 104 can send a message to the wireless device 102 notifying the user. The user can then determine whether he/she wants to visit the ride.

It should be noted that a user is not required to create a user profile 114 prior to arriving at the entertainment device 120. For example, when the interaction manager 110 at the wireless device 102 detects a communication device such as the transceiver 106 associated with an entertainment device 120, the interaction manager 110 can request a list of sensory effects utilized during the entertainment device event from the entertainment device controller 104 associated with the entertainment device 120. Alternatively, the controller 104 can detect a wireless device 102 via the transceiver 106 and automatically send the list of sensory effects to the wireless device 102.

Once the wireless device 102 receives the list of sensory effects from the controller 104 associated with the entertainment device 120, the interaction manager 110 prompts the user to enter his/her preferences for one or more of the sensory effects. The user then enters his/her preferences to create a user profile 114 similar to that discussed above. The interaction manager 110 then transmits the user profile 114 to the controller 104. The controller 104 then dynamically adapts the sensory effects produced during the entertainment device event based at least in part on the received user profile 130.

In another embodiment, the user can dynamically adjust the sensory effects during the entertainment device event. For example, a user can decide during a ride that a previously disabled sensory effect is to be enabled or that the intensity of a sensory effect is to be increased or decreased. In this embodiment, the user can adjust the user profile 114 and the updated user profile 114 is transmitted to the entertainment device controller 104. Alternatively, the controller 104 can send prompts to the wireless device 102 during each sensory effect to determine if the sensory effect needs to be adjusted or disabled. In this embodiment, any user changes are then stored in the corresponding user profile 130 at the controller and/or the user profile 114 at the wireless device 102.

As can be seen, the various embodiments of the present invention allow an entertainment experience associated with one or more users to be dynamically adjusted based on user profiles. A user can create, delete, and modify user profile via a wireless device. The user profiles include user preferences that indicate desired/undesired sensory effects. These preferences are used by a controller associated with an entertainment device to dynamically adapt an entertainment experience for the user.

The following are examples that illustrate the various embodiments of the present invention. In a first example, a user visits an amusement/theme park including communication devices such as transceivers 106, 108 in a general area such as the ticket collection gates. As a user with a wireless device 102 passes one of the transceivers 106 in a general area one or more user profiles 114 are transmitted to a general entertainment controller 104 via the transceiver 106. It should be noted that the wireless device 102 or the controller 104 can initiate the user profile transmission.

In this example, a single controller 104 associated with all entertainment devices 120, 122 can maintain a database 128 of user profiles 130 that have been received. Alternatively, each entertainment device 120, 122 can be associated with a separate controller and the received user profiles 130 are stored in a general repository that is accessible by each controller. Even further, the received user profiles 130 can be routed to each these separate controllers. Each of the separate controllers then maintains a copy of the user profile 130.

Each of the entertainment devices 120, 122 includes one or more communication devices such as a transceiver 106 or a radio frequency identification reader ("RFID reader). These communication devices are situated in close proximity to or at the boarding gate and/or the cart, seat, harness or other apparatus used for retaining one or more users during the ride. As a user passes one or these communication devices, at least the unique identifier 119 associated with the wireless device 102 is transmitted to or retrieved by the controller 104 associated with the ride via the communication device.

The unique identifier 119 is used by the entertainment device controller 104 to locate the user profile 130 associated with the wireless device 102. Also, receiving the unique identifier 119 indicates to the controller 104 that the user associated with the wireless device 012 is about to board or has just boarded the ride. The controller 104 uses the identified user profile 130 to personalize the user experience by dynamically adjusting the sensory effects as discussed above.

In another example, each of the entertainment devices 120, 122 has one or more communication devices such as a transceiver 106 situated in close proximity to an entrance of the ride. In this example, as the user approaches the entrance, the user profile 114 (if the controller 104 does not already have the user profile) along with the unique identifier 119 associated with the wireless device 102 is transmitted to or retrieved by the controller 104 associated with the ride via the transceiver 106. The controller 104 compares the received user profile 130 to the sensory effects associated with the ride and determines if any of the available sensory effects has been designated as undesirable by the user. For example, the controller 104 compares the received user profile 130 to the entertainment device profile 134 associated with the entertainment device 120. If so, the controller 104 sends a prompt via the transceiver 104 to the wireless device 102 that notifies the user of the undesirable sensory effects. The user can then chose enter the ride or move on.

In yet another example, each of the entertainment devices 120, 122 has one or more communication devices situated such as a transceiver 104 in close proximity to or at the boarding gate and/or the cart, seat, harness or other apparatus used for retaining one or more users during the ride. As a user passes one or these transceivers 106, at least the user profile 114 (if the controller does not already have the user profile) and/or the unique identifier 119 associated with the wireless device 102 is transmitted to or retrieved by the controller associated with the ride via the transceiver.

The unique identifier 119 is used by the controller 104 to locate the user profile associated with the wireless device. Also, receiving the unique identifier 119 indicates to the controller that the user associated with the wireless device 102 is about to board or has just boarded the ride. However, the because the transceiver 106 is located at the boarding gate or within the apparatus retaining the user, the controller 104 can determine that the user is boarding the ride or has boarded the ride based on receiving only the user profile 114. In other words, the unique identifier 119 is not always required. The controller 104 uses the received user profile 130 to personalize the user experience by dynamically adjusting the sensory effects as discussed above.

In another embodiment, each of the entertainment devices 120, 122 has one or more communication devices such as a transceiver 106 or an RFID reader situated in strategic locations throughout the ride. As a user passes one or these transceivers 106 or RFID readers, at least the user profile 114 (if the controller does not already have the user profile) and/or the unique identifier 119 associated with the wireless device 102 is transmitted to or retrieved by the controller associated with the ride via the transceiver 106 and/or RFID reader. If the controller 104 already has a user profile 130, only the unique identifier 119 needs to be transmitted as the wireless device 102 approaches various sections of the ride. This allows the controller 104 to determine when to dynamically adapt the sensory effects.

The controller 104 analyzes the received user profile 130 to determine if and how to dynamically adapt the sensory effects for that particular location or section of the ride. For example, a user can have different intensity levels set for the same sensory effect depending on the location of the ride. As the wireless device 102 communicates with each transceiver 106 or RFID reader at the different locations/sections of the ride, the controller 104 dynamically adapts sensory effects for each section based on the received user profile 130.

Figure 3:
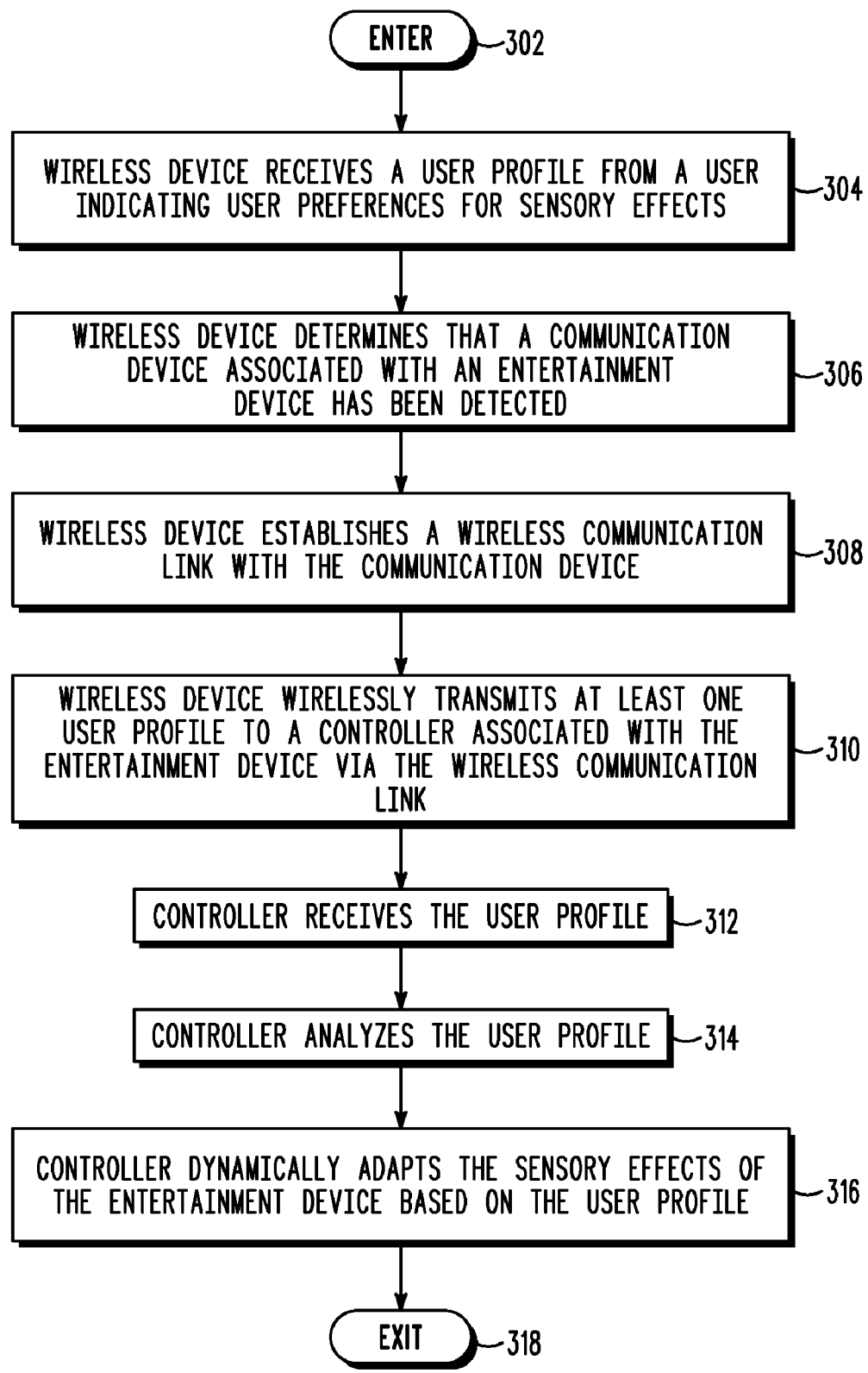
FIG. 3 is an operational flow diagram illustrating an example of one process of dynamically adapting an entertainment experience for a user according to one embodiment of the present invention.

Process Flows For Dynamically and Autonomously Adapting Entertainment Experiences FIG. 3 is an operational flow diagram illustrating a process of dynamically and autonomously adapting entertainment experiences based on user profiles. The operational flow diagram of FIG. 3 begins at step 302 and flows directly to step 304. The wireless device 102, at step 304 receives a user profile 114 from a user indicating user preferences for sensory effects produce by sensory devices 136, 138, 140, 142. The wireless device 102, at step 306, determines that a communication device such as a transceiver 106 associated with an entertainment device 120 has been detected.

The wireless device 102, at step 308, establishes a wireless communication link with the communication device 106. The wireless device 102, at step 310, wirelessly transmits via the communication device 106 at least one user profile 114 to an entertainment device controller 104 that is associated with the entertainment device 120.

The controller 104, at step 312, receives the user profile 114 and stores the profile 114 as a received user profile 130. The controller 104, at step 314, analyzes the received user profile 130. The controller 104, at step 316, dynamically and autonomously adapts the sensory effects of the entertainment device 120 based on the received user profile 130. The control flow then exits at step 318.

Figure 4:
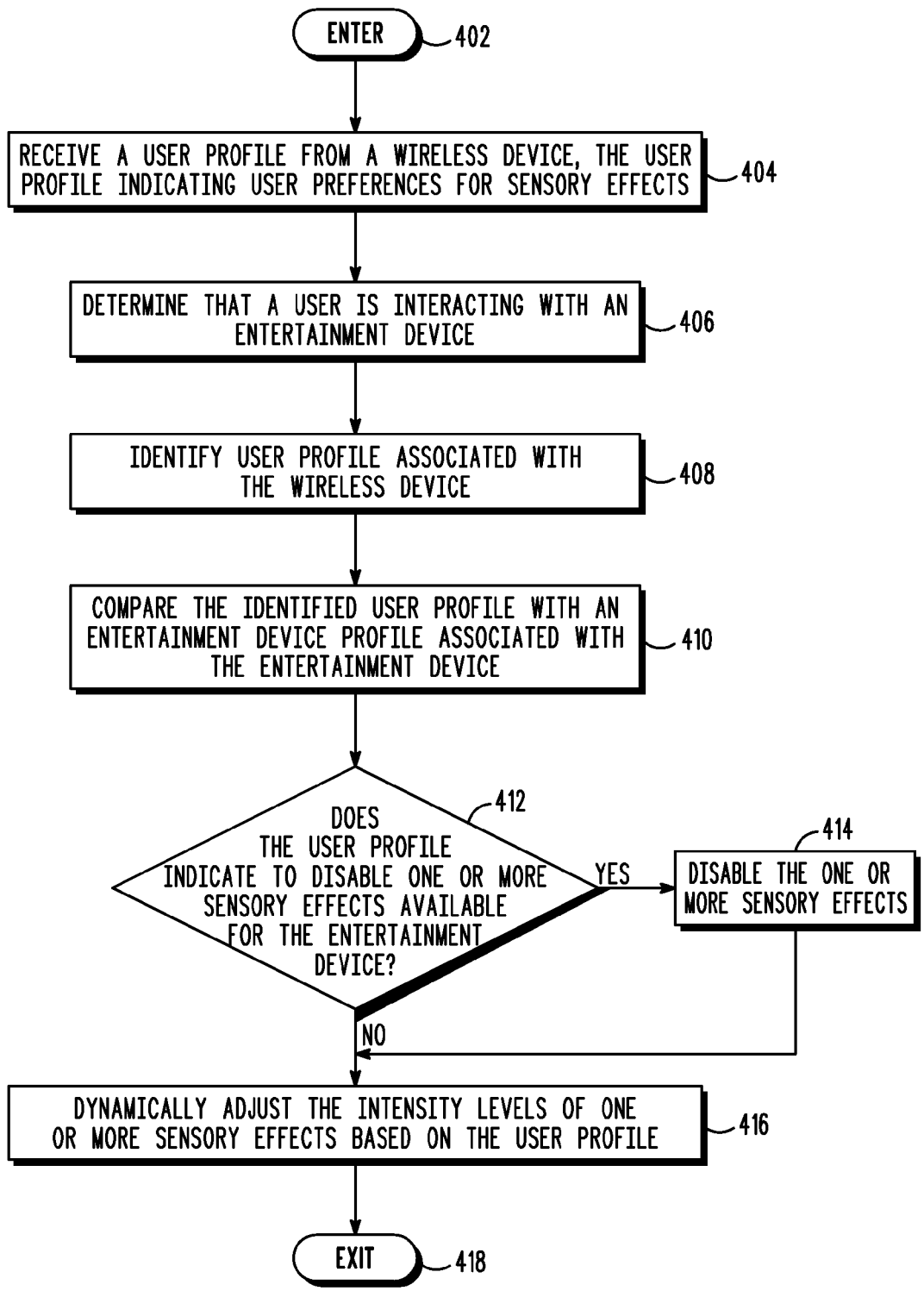
FIG. 4 is an operational flow diagram illustrating a second example of a process of dynamically adapting an entertainment experience for a user according to one embodiment of the present invention.

FIG. 4 is an operational flow diagram illustrating a more detailed process of dynamically and autonomously adapting entertainment experiences based on user profiles. The operational flow diagram of FIG. 4 begins at step 402 and flows directly to step 404. The entertainment device controller 104, at step 404, receives/retrieves a user profile 114 from a wireless device 102 and stores the profile 114 as a received user profile 130. The received user profile 130 indicates user preferences for sensory effects.

The controller 104, at step 406, determines that a user is interacting with an entertainment device 120. For example, a transceiver 106 situated in close proximity to the entertainment device 120 can receive a unique identifier 119 from the wireless device 102 and transmit the identifier 119 to the controller 119. This indicates to the controller 104 that a user associated with the wireless device 102 is interacting with the entertainment device 104. The controller 104, at step 408, identifies a received user profile 130 that is associated with the wireless device 102.

The wireless device 102, at step 310, compares the identified user profile 130 with an entertainment device profile 134 that is associated with the entertainment device 120. As discussed above, the entertainment device profile 134 includes a list of sensory devices 136, 138 and their sensory effects available at the entertainment device 120. The controller 104, at step 412, determines if the user profile 130 indicates to disable one or more sensory effects available for the entertainment device 120.

If the result of this determination is positive, the controller 104, at step 414, disables the one or more sensory effects. The control then flows to step 416. If the result of this determination is negative, the controller 104, at step 416, dynamically and autonomously adapts the sensory effects of the entertainment device 120 based on the received user profile 130. The control flow then exits at step 418.

Wireless Device

Figure 5:
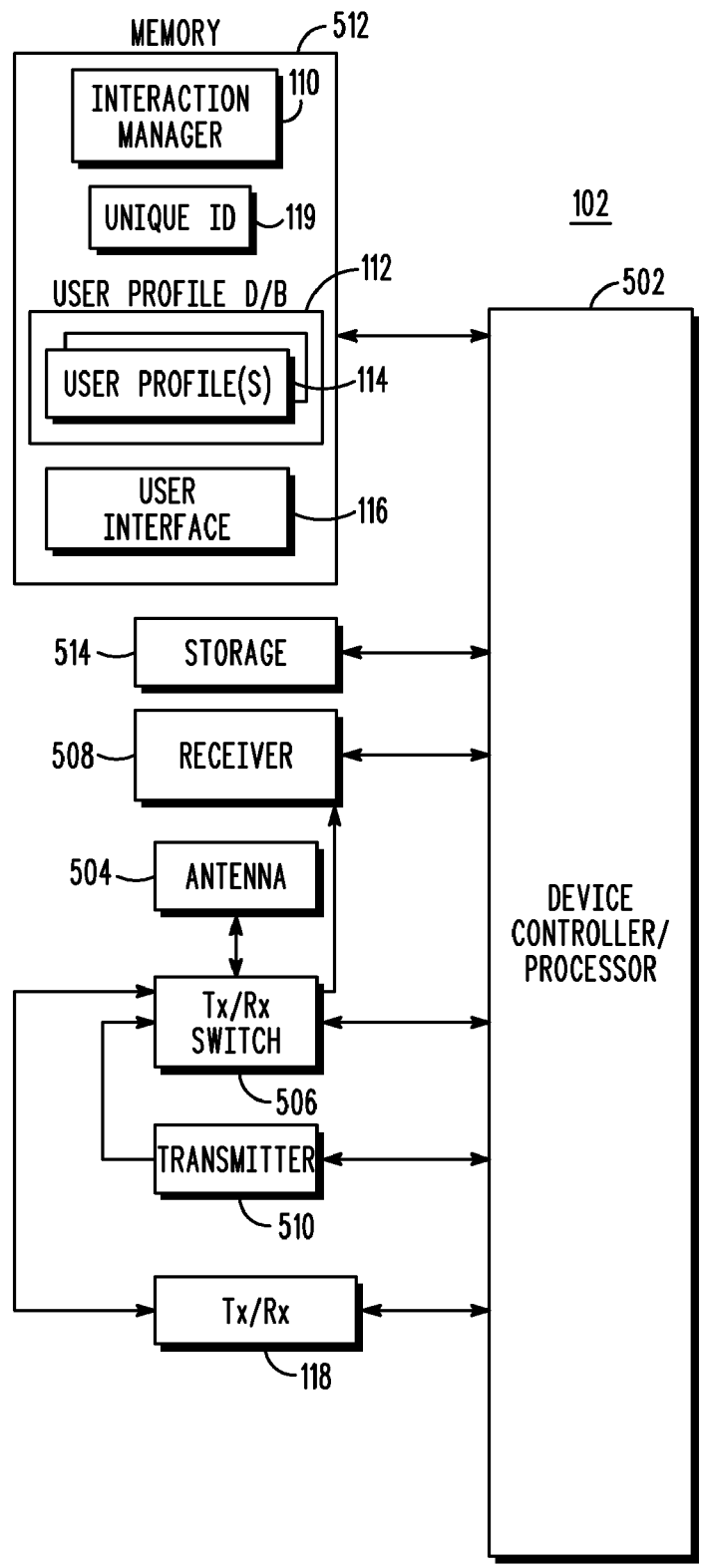
FIG. 5 is a block diagram illustrating a wireless device according to one embodiment of the present invention.

FIG. 5 is a block diagram illustrating a detailed view of the wireless device 102 according to one embodiment of the present invention. It is assumed that the reader is familiar with wireless communication devices. To simplify the present description, only that portion of a wireless communication device that is relevant to the present invention is discussed.

The wireless device 102 operates under the control of a device controller/processor 502, that controls the sending and receiving of wireless communication signals. In receive mode, the device controller 502 electrically couples an antenna 504 through a transmit/receive switch 506 to a receiver 508. The receiver 508 decodes the received signals and provides those decoded signals to the device controller 502.

In transmit mode, the device controller 502 electrically couples the antenna 504, through the transmit/receive switch 506, to a transmitter 510. The wireless device 102 can also include an additional transceiver 118 as discussed above. However, the receiver 508 and transmitter 510 can also provide the functionality of the transceiver 118 discussed above. The wireless device 102 also includes volatile memory 512 and non-volatile storage memory 514. Either of these memories 512, 514 can include the unique identifier 119, the interaction manager 110, the user profile database 112, user profiles 114, and the user interface 116. Each of these components has been discussed above in greater detail.

Information Processing System

Figure 6:
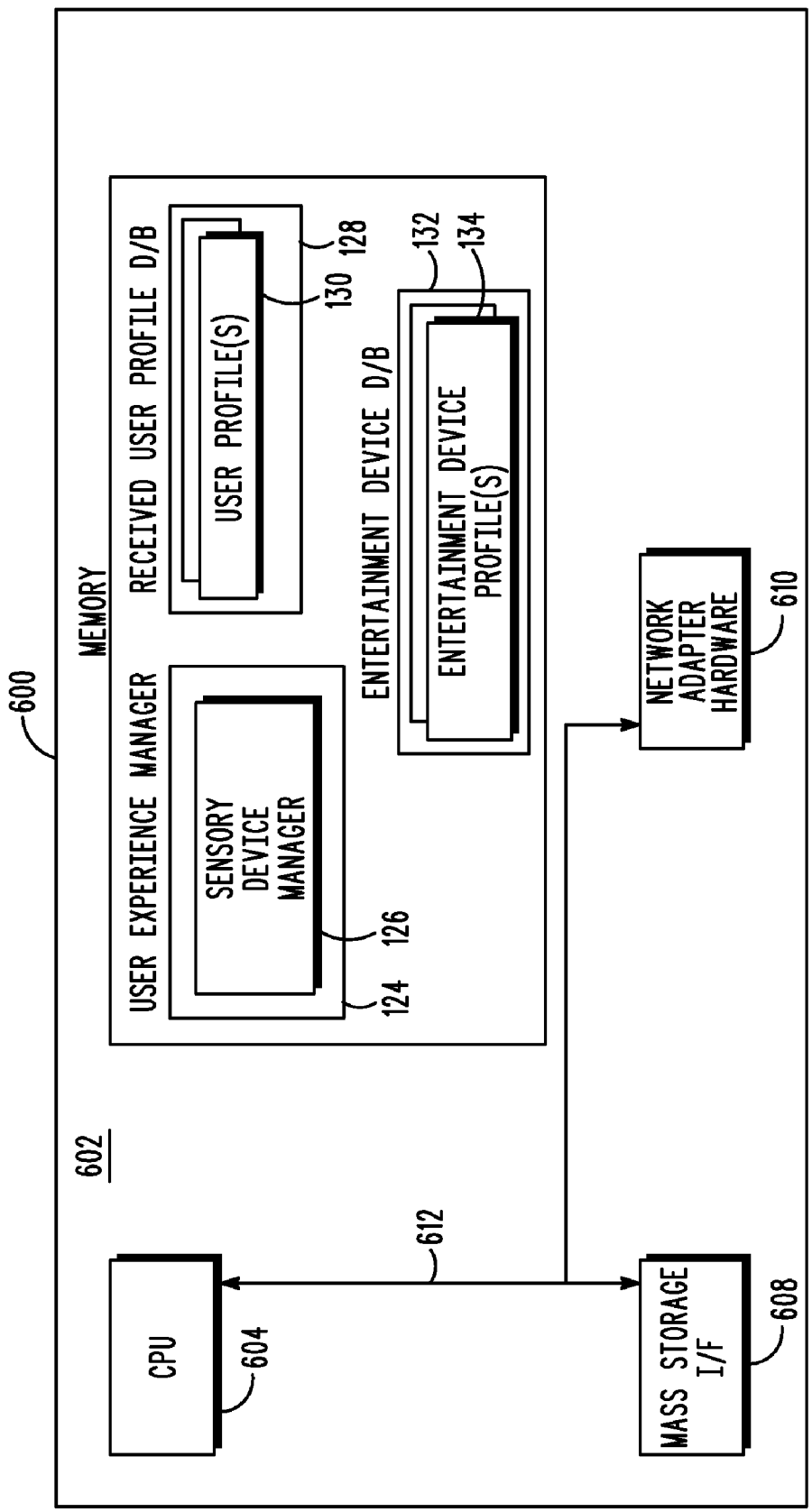
FIG. 6 is a block diagram illustrating a detailed view of an information processing system according to one embodiment of the present invention.

FIG. 6 is a block diagram illustrating a detailed view of an information processing system 600 such as the entertainment device controller 120 discussed above. The information processing system 600 includes a computer 602. The computer 602 has a processor 604 that is connected to a main memory 606, a mass storage interface 608, and network adapter hardware 610. A system bus 612 interconnects these system components. The mass storage interface 608 is used to connect mass storage devices, such as a data storage device to the information processing system 600.

The main memory 606, in one embodiment, includes the user experience manager 124, the sensory device manager 126, the received user profile database 128, received user profiles 130, entertainment device database 132, and entertainment device profiles 134, which have discussed above in greater detail. The network adapter hardware 610 is used to provide an interface to a network (not shown). Various embodiments of the present invention can be adapted to work with any data communications connections including present day analog and/or digital techniques or via a future networking mechanism.

Non-Limiting Examples

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A method, with a wireless device, for dynamically adapting a physical entertainment experience for a user, the method comprising:
   identifying at least one communication device associated with an entertainment device, wherein the at least one communication device is situated in close proximity to the entertainment device;
   wirelessly transmitting, in response to identifying the at least one communication device, at least one user profile via the at least one communication device to a controller associated with the entertainment device, wherein the user profile includes at least a set of preferences associated with at least one sensory effect available at the entertainment device, wherein the controller uses the set of preferences to dynamically adapt a behavior of the entertainment device with respect to the at least one sensory effect for at least one user associated with the wireless device;
   receiving from the controller, a set of sensory effects available at the entertainment device that the at least one user has designated as undesirable in the user profile; and
   displaying a message to the at least one user via a user interface of the wireless device notifying the at least one user that the entertainment device includes sensory effects that have been designated as undesirable.

2. The method of claim 1 further comprising:
   establishing, in response to identifying the at least one communication device, a communication link with the at least one communication device.

3. The method of claim 2 wherein the communication link is established using a short range radio technology.

4. The method of claim 1 wherein the set of preferences associated with the at least one sensory effect indicates that the at least one sensory effect is one of: desired and undesired.

5. The method of claim 1 wherein the set of preferences associated with the at least one sensory effect includes an intensity level used by the controller to apply the at least one sensory effect.

6. A method, with an information processing system, for dynamically adapting a physical entertainment experience for a user, the method comprising:
   receiving, from at least one communication device situated in close proximity to an entertainment device, at least one user profile associated with a wireless device;
   identifying in the at least one user profile at least one set of desired sensory effects associated with at least one user associated with the wireless device;
   dynamically adapting at least one behavior of the entertainment device based on at least one of the set of desired sensory effects;
   identifying in the at least one user profile at least one set of undesired sensory effects associated with at least one user associated with the wireless device;
   determining that the entertainment device performs the at least one set of undesired sensory effects; and
   notifying the wireless device that the entertainment device performs the at least one set of undesired sensory effects.

7. The method of claim 6 wherein identifying at least one set of desired sensory effects further comprises:
   determining that the at least one user is interacting with the entertainment device.

8. The method of claim 6 wherein determining that the at least one user is interacting with the entertainment device further comprises:
   receiving a unique identifier identifying a user associated with the wireless device.

9. The method of claim 8 wherein the receiving a unique identifier comprises:
   receiving the unique identifier by at least one of the following: keypad entry via a keypad proximate to the entertainment device, wireless communication with the at least one communication device associated with the wireless device, and data entry by a system operator proximate to the entertainment device.

10. The method of claim 6 wherein determining that the entertainment device performs the at least one set of undesired sensory effects further comprises:
    comparing the at least one set of undesired sensory effects to a profile associated with the entertainment device, wherein the profile associated with the entertainment device includes a set of sensory effects available at the entertainment device.

11. The method of claim 6 further comprising:
identifying in the at least one user profile an intensity setting associated with at least one desired sensory effect in the set of desired sensory effects.

12. The method of claim 11 wherein dynamically adapting the at least one behavior of the entertainment device further comprises:
dynamically adjusting an intensity level of the at least one desired sensory effect based on the intensity setting.

13. The method of claim 6 wherein dynamically adapting the at least one behavior of the entertainment device further comprises at least one of:
performing only the set of desired sensory effects while the at least one user is interacting with the entertainment device; and
dynamically adjusting sensory effects performed by the entertainment device based on a location of the at least one user within the entertainment device.

14. A wireless device comprising:
a memory;
a processor communicatively coupled to the processor; and
a interaction manager communicatively coupled to the memory and the processor,
wherein the interaction manager is adapted to:
identify at least one communication device associated with an entertainment device, wherein the at least one communication device is situated in close proximity to the entertainment device;
wirelessly transmit, in response the at least one communication device having been identified, at least one user profile via the at least one communication device to a controller associated with the entertainment device, wherein the user profile includes at least a set of preferences associated with at least one sensory effect available at the entertainment device, wherein the controller uses the set of preferences to dynamically adapt a behavior of the entertainment device with respect to the at least one sensory effect for at least one user associated with the wireless device;
receive from the controller, a set of sensory effects available at the entertainment device that the at least one user has designated as undesirable in the user profile; and
display a message to the at least one user via a user interface of the wireless device notifying the at least one user that the entertainment device includes sensory effects that have been designated as undesirable.

15. The wireless device of claim 14 wherein the interaction manager is further adapted to:
establish, in response the at least one communication device having been identified, a communication link with the at least one communication device.

16. The wireless device of claim 15 wherein the communication link is established using a short range radio technology.

17. The wireless device of claim 14 wherein the set of preferences associated with the at least one sensory effect includes an intensity level used by the controller to apply the at least one sensory effect.

* * * * *